United States Patent
Blattner et al.

(10) Patent No.: US 7,664,961 B2
(45) Date of Patent: Feb. 16, 2010

(54) WIRELESS HANDHELD DEVICE WITH LOCAL BIOMETRIC AUTHENTICATION

(75) Inventors: George W. Blattner, Oakdale, MN (US); Robert C. Martin, St. Paul, MN (US); Trung V. Le, White Bear Township, MN (US)

(73) Assignee: Imation Corp., Oakdale, MN (US)

( * ) Notice: Subject to any disclaimer, the term of this patent is extended or adjusted under 35 U.S.C. 154(b) by 892 days.

(21) Appl. No.: 11/224,889

(22) Filed: Sep. 12, 2005

(65) Prior Publication Data
US 2007/0057763 A1 Mar. 15, 2007

(51) Int. Cl.
*H04L 9/00* (2006.01)
*G06F 7/04* (2006.01)
*G06F 11/00* (2006.01)

(52) U.S. Cl. .................. 713/186; 713/182; 713/183; 713/184; 713/185; 726/27; 726/28; 726/29; 726/30

(58) Field of Classification Search .................. 713/186
See application file for complete search history.

(56) References Cited

U.S. PATENT DOCUMENTS

| | | | | |
|---|---|---|---|---|
| 6,148,094 | A * | 11/2000 | Kinsella | ................... 382/124 |
| 6,405,278 | B1 | 6/2002 | Liepe | |
| 6,486,875 | B1 | 11/2002 | O'Donnell, Jr. | |
| 6,809,722 | B2 | 10/2004 | Mei et al. | |
| 7,352,862 | B2 * | 4/2008 | Kurashima et al. | ............ 380/42 |
| 2002/0038427 | A1 | 3/2002 | Krieger | |
| 2002/0104006 | A1 | 8/2002 | Boate et al. | |
| 2003/0005337 | A1 | 1/2003 | Poo et al. | |
| 2005/0237304 | A1 * | 10/2005 | Anandakumar et al. | ..... 345/166 |

FOREIGN PATENT DOCUMENTS

KR 2-3-0000163 A * 1/2003

OTHER PUBLICATIONS

"RF Wireless Presenter X-Pointer Mouse with 64MB Memory," Alpha and Omega computer corporation, 2 pages, printed Dec. 8, 2005, http://www.aocusa.com/pview.php?q=&c=&model=MO=XP-210.

"Memory Optical Mini Mouse w/128MB Flash Memory," Iogear, 2 pages, printed Dec. 8, 2005, http://www.iogear.com/main.php?loc-product&Item=GME224M128.

* cited by examiner

*Primary Examiner*—Longbit Chai
(74) *Attorney, Agent, or Firm*—Shumaker & Sieffert, P.A.

(57) ABSTRACT

The invention is directed to a wireless handheld device that securely accesses one or more remote devices subject to locally authenticating a user via biometrics. The device may be implemented as a wireless mouse with a biometric sensor incorporated with a scroll wheel that captures a biometric from the user and authenticates the user to the device using the captured biometric. More specifically, the captured biometric is compared to a template stored in memory. The device transmits a wireless signal, such as a command stream including the user's user name and password, to access the remote devices when the captured biometric matches the template. However, the device does not operate when the user is not authenticated. Accordingly, the invention may be particularly useful to log-on and log-off a user who frequently leaves and returns to a personal computer or various remote devices during the course of a day.

12 Claims, 5 Drawing Sheets

WIRELESS HANDHELD DEVICE WITH LOCAL BIOMETRIC AUTHENTICATION

TECHNICAL FIELD

The invention relates to a wireless handheld device and, more particularly, to a wireless handheld device that communicates with one or more remote devices.

BACKGROUND

Wireless handheld devices are used for a wide range of applications and operate according to variety of wireless communication standards such as radio frequency identification (RFID), wireless universal serial bus (USB), ultra wideband (UWB), Bluetooth, IEEE 802.11(a), IEEE 802.11(b), 802.11(e), 802.11(g), and other existing wireless communication protocols. Examples of wireless handheld devices include a key fob for keyless entry, a remote control for a television, a wireless mouse, a cell phone, a smart phone, a personal digital assistant (PDA), a wireless mouse, a wireless flash memory device, and the like.

Many wireless handheld devices are personal devices that provide access to a vehicle, business, home, or contain sensitive information. Accordingly, such handheld wireless devices are not intended to be operated by unauthorized users.

SUMMARY

In general, the invention is directed to a wireless handheld device with local biometric authentication that communicates with remote devices. More specifically, the wireless handheld device permits a user to operate the device subject to locally authenticating the user via biometrics. For example, upon authorizing a user based on a biometric, e.g., a fingerprint, the user can operate the handheld device to communicate with one or more remote devices. In operation, the handheld device wirelessly communicates with the one or more remote devices to access or, optionally, exchange information with the remote devices. The handheld device does not operate when a user has not been authorized. Thus, the handheld device allows authorized users to securely access and exchange information with remote devices.

The wireless handheld device provides secure access to one or more remote devices by performing local biometric authentication, i.e., authenticating the user to the wireless handheld device using biometrics. When the user is authenticated, the wireless handheld device wirelessly transmits a command stream or command string to access a remote device. As an example, the wireless handheld device may remotely log the user on a personal computer by sending a command stream such as "Control/Alt/Delete" followed by the user name and password and "Enter." The wireless handheld device may also be used to exchange information such as mail, file, folder, calendar, medical, and other personal information stored in resident memory, e.g., flash memory, with a personal computer or other remote device after the remote device has been accessed. The wireless handheld device and remote devices may employ encryption techniques used in existing wireless protocols to ensure that the remote devices accept commands only from authorized users.

In addition, the command stream transmitted by the wireless handheld device may include a code, such as a password, to uniquely identify the user to the remote device. Thus, the wireless handheld device provides a first level of security by locally authenticating a user via biometrics and a second level of security by transmitting a user name and password to access a remote device. In this manner, the wireless handheld device allows a user to securely access one or more remote devices subject to local biometric authentication, rather than providing access based on a user name and password or tokens, such as smart cards, which can be stolen, seen, or otherwise acquired by unauthorized persons.

The wireless handheld device may comprise a portable personal identification device that provides an authorized user access to one or more remote devices. Accordingly, the wireless handheld device may conform to a device similar to a key fob used for keyless entry to a vehicle or other personal identification device that may easily be carried by, or attached to a user. In some embodiments, other devices, such as a mouse or pointing device, a personal digital assistant (PDA), a cell phone, and other personal digital devices may be incorporated with the wireless handheld device. As an example, the wireless handheld device may comprise a wireless mouse with a biometric sensor that, upon authenticating a user, logs the user onto a personal computer and provides cursor control. However, in contrast to a key fob used for keyless entry to a vehicle, the wireless handheld device enables an authorized user access to various remote devices, e.g., a personal computer, a workstation, a laptop computer, and other remote digital computing devices, each of which may be located in a different area. For example, the wireless handheld device may be used to communicate with various remote devices located in different areas at separate times, but is more typically used to communicate with a single remote device located in close proximity to the user at a particular time. In either case, the wireless handheld device enables an authorized user to securely access one or more remote devices without requiring the user to remember or enter user names and passwords. Moreover, local biometric authentication allows secure access to remote devices and prevents unauthorized access to the wireless handheld device and the resident flash memory.

As described herein, the wireless handheld device captures a biometric from the user and securely accesses a remote device subject to authenticating the user based on the captured biometric. In particular, the wireless handheld device generates a digital representation of the captured biometric and compares the digital representation of the captured biometric to a template stored in memory. The template may be stored in memory upon completing an initial registration process. If the digital representation of the captured biometric matches the stored template, the user is authenticated and the wireless handheld device is activated. In other words, the wireless handheld device may operate only after the device has authenticated the user. Moreover, the wireless handheld device may also exchange information with the remote device after the user has been granted access to the remote device.

The wireless handheld device may be activated or communicate with the remote devices in response to authenticating the user. In this case, the wireless handheld device may send a command string, in accordance with a wireless access protocol, when the user is authenticated to access a remote device without requiring the user to activate a separate button. For example, the wireless handheld device may conform to a wireless mouse with a biometric sensor incorporated with the scroll wheel of the wireless mouse. Consequently, the user is authenticated each time the user operates the scroll wheel, i.e., the device provides repeated authentication of the user and operates only after the user has been authenticated.

Alternatively, the wireless handheld device may conform to a wireless mouse that includes resident flash memory but may not require local biometric authentication to operate. Unlike a mouse with flash memory that communicates with and receives power from a personal computer or other similar computing device via a USB connection or other wired connection, the invention provides a single enclosure that houses a wireless mouse with resident flash memory and a power source that provides power to the wireless mouse with flash memory. Thus, the wireless mouse with flash memory eliminates the need for a mouse and a separate storage device. Furthermore, rather than communicating with a personal computer via a wired connection, the wireless handheld device wirelessly communicates with a personal computer. As a result, the wireless mouse with flash memory provides compact data storage, requires less space to operate, and is easily transportable.

In one embodiment, the invention is directed to a wireless handheld device comprising a biometric sensor that captures a biometric from a user and generates a digital representation of the captured biometric, memory that stores one or more biometric templates, an authenticator that compares the digital representation of the captured biometric to the one or more biometric templates, a transceiver that sends a wireless signal to access one or more remote devices subject to matching the captured biometric to one of the one or more biometric templates, and a battery that powers the biometric sensor, memory, authenticator, and transceiver.

In another embodiment, the invention is directed to a method comprising capturing a biometric from a user in a wireless handheld device, comparing the captured biometric to one or more biometric templates stored in a resident memory of the wireless handheld device, when the captured biometric matches one of the biometric templates, sending a wireless signal from the wireless handheld device to access one or more remote devices, and when the captured biometric does not match one of the biometric templates, denying access to the remote devices via the wireless handheld device.

In another embodiment, the invention is directed to a wireless mouse comprising a processor that processes input signals that control the operation of the wireless mouse, a flash memory drive that stores data, and a transceiver that wirelessly communicates with one or more remote devices to send data stored in the flash memory drive, receive data to be stored in the flash memory drive, and navigate a graphical user interface on the remote devices.

The invention may be capable of providing one or more advantages. For example, unlike a personal identification device that employs local biometric capture (without local authentication), and cryptography to access a remote device, the invention accesses one or more remote devices subject to locally authenticating the user via biometrics. In particular, the invention wirelessly transmits a command stream to access the remote device in response matching a biometric, e.g., a fingerprint, captured to a template stored in resident memory and does not require a secure server to store cryptographic keys. Operation of devices can be limited to authorized users, and secure wireless communication protocols may be used to communicate with the remote device. As a result, the invention allows secure access to one or more remote devices and prevents unauthorized operation and access to resident memory without requiring additional hardware, i.e., a secure server.

Further, the invention may comprise a wireless mouse with resident flash memory. A mouse with a wired connection, such as a USB connection, is generally inconvenient and space consuming to operate. In contrast, the wireless mouse with resident flash memory can be operated without the restrictions and inconvenience of wires and is easily transportable. Thus, the wireless mouse with resident flash memory can be conveniently transported and operated with compliant computing devices while also providing compact data storage.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
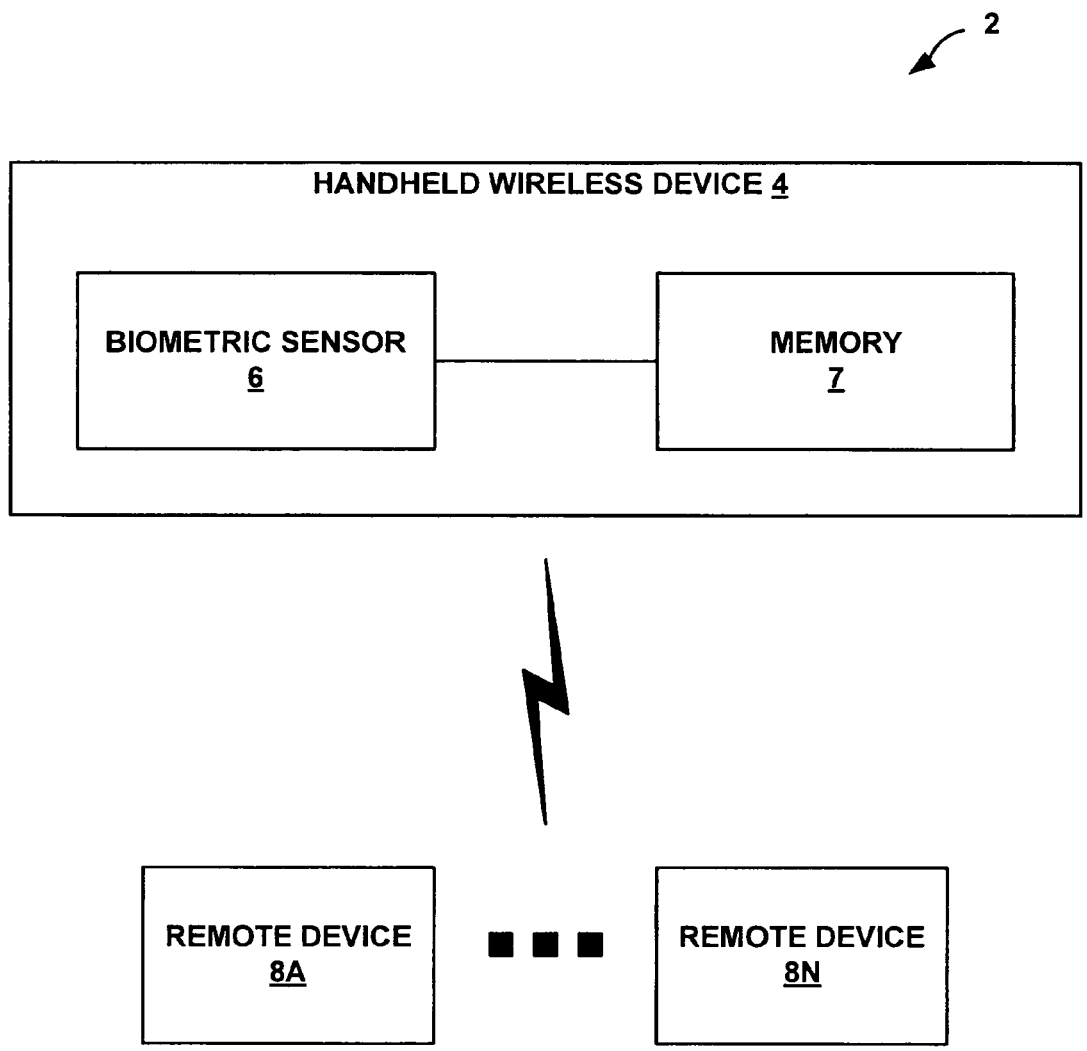
FIG. 1 is a block diagram illustrating a wireless communication system including a wireless handheld device with local biometric authentication that communicates with one or more remote devices in accordance with an embodiment of the invention.

FIG. 1 is a block diagram illustrating wireless communication system 2 in which wireless handheld device 4 securely accesses one or more of remote devices 8A-8N (collectively referred to as "remote devices 8") and, optionally, exchanges information with remote devices 8. In particular, wireless handheld device 4 permits a user (not shown) to operate device 4 subject to locally authenticating the user via biometrics. As shown in FIG. 1, wireless communication device 4 wirelessly communicates with remote devices 8 which are programmed to accept input from and provide output to device 4. Wireless handheld device 4 and remote devices 8 may employ wireless protocols such as RFID, Ultra Wideband (UWB), wireless USB, Bluetooth, 802.11(a), 802.11(b), 802.11(e), 802.11(g), or other wireless protocols to wirelessly communicate with each other. However, wireless handheld device 4 does not operate and, therefore, does not wirelessly communicate with remote devices 8, when a user has not been authorized. Thus, wireless handheld device 4 allows authorized users to securely access and exchange information with remote devices 8.

Wireless handheld device 4 may comprise a portable personal identification device that provides an authorized user access to remote devices 8. Remote devices 8 may comprise various remote devices, such as a personal computer, a workstation, a laptop computer and other remote digital computing devices or devices to which secure remote access is desirable, each of which may be located in a different area. Accordingly, wireless handheld device 4 may log an authorized user onto various remote computing devices and may conform to a device similar to a key fob used for keyless entry to a vehicle or other personal identification device that may easily be carried by, or attached to a user. However, in contrast to a key fob used for keyless entry to a vehicle, wireless handheld device 4 enables an authorized user to access various remote devices, such as personal computers, workstations, laptop computers, or any combination thereof. In particular, wireless handheld device 4 may communicate with each of remote devices 8 at separate times, but typically communicates with a particular one of remote devices 8 at a given time. The particular one of remote devices 8 in communication with wireless handheld device 4 is generally located in close proximity to the user operating device 4 while the remaining remote devices 8 are not located within range of transmission of wireless handheld device 4. If more than one of remote devices 8 is in close proximity to wireless handheld device 4, wireless handheld device 4 may selectively access one of remote devices 8 by, for example, directional communication, assigning each of remote devices 8 to an operable button or sequence of buttons on device 4, or other means.

In general, wireless handheld device 4 provides secure access to remote devices 8 subject to locally authenticating a user via biometrics. When a user is not authenticated, wireless handheld device 4 does not operate and the user cannot access remote devices 8. In particular, wireless handheld device 4 includes a biometric sensor 6 that captures a biometric, e.g., a fingerprint, from the user and locally authenticates the user, i.e., authenticates the user to device 4 using the captured biometric. Biometric sensor 6 may comprise a fingerprint microchip transducer which takes an image of the user's finger and generates a digital representation of the captured fingerprint. However, the fingerprint microchip transducer is merely exemplary and should not be considered limiting. For example, biometric sensor 6 may also comprise other transducers for capturing other types of biometrics, such as voice characteristics, iris pattern, and facial features and generating a digital representation of the captured biometric. In any case, wireless handheld device 4 compares the digital representation of the captured fingerprint to a template stored in resident memory 7, e.g., flash memory. The template to which the captured biometric is compared may be stored in memory 7 upon completing an initial registration process that registers a new user as being authorized to operate wireless handheld device 4.

Wireless communication system 2 may employ an initial registration process for registering a new user as being authorized to operate wireless handheld device 4 for accessing remote devices 8. As an example, software or an application, which may be contained on a compact disc (CD), is installed and the registration process performed for each of remote devices 8. When a particular one of remote devices 8 runs the application, the user may be prompted to enter a user name and password, for example, the user's current user name and password, to which security privileges are assigned. Next, the user may be prompted to place a finger on biometric sensor 6 to allow wireless handheld device 4 to sample the user's fingerprint until a consistent and satisfactory template is achieved. The resulting fingerprint template is stored in memory 7 and is not transferred to remote device 8 or any external component of wireless communication system 2. More specifically, the template may be stored in secure storage within memory 7 to securely store the template in order to prevent the template from being recovered if wireless handheld device 4 is stolen.

To complete the registration process, remote devices 8 associate the security privileges that were associated with the user name and password entered by the user with the user's fingerprint. As a result, an authorized user can operate wireless handheld device 4 to securely access remote devices 8 without being required to remember or enter a user name and/or password. Moreover, local biometric authentication allows secure access to remote devices 8 and prevents any unauthorized person from operating wireless handheld device 4 and accessing memory 7.

In operation, wireless handheld device 4 wirelessly transmits a command stream or command string to remotely access remote devices 8. As an example, wireless handheld device 4 may transmit a command stream, such as "Control/Alt/Delete" followed by a user name and password and "Enter," to remotely log the authorized user onto a personal computer. The user name and password is stored in memory 7 during the initial registration process so that the user does not have to enter or recall the user name and/or password. In one example, wireless handheld device 4 may store a single user name and password in memory 7 for accessing remote devices 8. However, wireless handheld device may store more than one user name and password in memory 7. In this example, a different user name and password may be stored in memory 7 to access each of remote devices 8 as well as separate user names and passwords for selectively accessing software, programs, websites, and the like on remote devices 8. Accordingly, wireless handheld device 4 may identify which particular one of remote devices 8 the authorized user is attempting to access by transmitting an initial query signal. In response to receiving the query signal, remote devices 8 may send a signal to wireless handheld device 4 that includes identification information associated with remote devices 8. Thus, wireless handheld device 4 can selectively transmit the appropriate user name and password to access remote devices 8 based on the received identification information. Wireless handheld device 4 provides a first level of security by locally authenticating the user via biometrics, and a second level of security by transmitting a user name and password to access remote devices 8.

In addition to accessing remote devices 8, wireless handheld device 4 may also exchange information with remote devices 8, such as mail, file, folder, calendar, medical and other personal information stored in memory 7. For example, an authorized user may interact with a particular one of remote devices 8 to create or modify a data file, such as a Microsoft Word document or other Microsoft Office document. The authorized user may then save the data file in memory 7 and travel to a different location where another one of remote devices 8 is located. The authorized user may operate wireless handheld device 4 to access the second one of remote devices 8 and transfer the data file to memory within the second one of remote devices 8 thereby allowing the authorized user to interact with the second one of remote devices 8 to modify the file. Moreover, wireless handheld device 4 may synchronize information stored in memory 7 with information stored in memory within remote devices 8 in similar fashion as a PDA. Consequently, wireless handheld device 4 provides transportable compact data storage and may eliminate the need to carry a separate external storage drive or device.

Wireless communication system 2 may employ encryption techniques used in existing wireless protocols to prevent an unauthorized party from compromising wireless communication system 2. More specifically, wireless handheld device 4 may employ encryption techniques when transmitting the command stream, data stored in memory 7, or any sensitive information to remote devices 8. In a similar manner, remote devices 8 may employ encryption techniques when transmitting data or any sensitive information to wireless handheld device 4.

In some embodiments, other devices, such as a wireless mouse or pointing device, a personal digital assistant (PDA), a cell phone, and other personal digital devices may be incorporated with wireless handheld device 4 in accordance with the trend of multi-functional devices. As an example, wireless handheld device 4 may comprise a wireless mouse with biometric sensor 6 that captures a biometric from a user and, upon locally authenticating the user, logs the user onto a personal computer. In this case, remote devices 8 may also be programmed to receive input, such as cursor control and context menu commands as well as mail, file, folder, calendar, medical and other personal information stored in memory 7.

In addition, wireless handheld device 4 may be activated or may communicate with remote devices 8 in response to authenticating the user. In this case, wireless handheld device 4 may send a command string to access one of remote devices 8 when the user is authenticated without requiring the user to activate a separate button or place a finger on a separate biometric sensor. For example, when implemented as a wireless biometric mouse, biometric sensor 6 may be incorporated with the scroll wheel of the wireless mouse. In this example, the user is authenticated each time the user operates the scroll wheel, i.e., the device provides repeated authentication of the user and operates only after the user has been authenticated. Biometric sensor 6 may also be incorporated with other operable buttons, such as the standard right or left buttons of a mouse, or strategically positioned so that a user's finger rests on biometric sensor 6 during operation. In any case, wireless handheld device 4 may automatically access remote devices 8 in response to authorizing a user and/or may repeatedly or constantly attempt to authorize the user.

Wireless handheld device 4 may be particularly advantageous when implemented as a wireless biometric mouse because users frequently leave and return to a personal computer or access a number of personal computers during the course of a day. Consequently, a user is conventionally required to frequently log on and log off, which requires entering a user name and/or password. In addition, conventionally, if a user leaves a personal computer unattended, an unauthorized party may have visual access to sensitive information or may easily gain access to sensitive information. In contrast to typical methods for logging on and logging off of a personal computer, wireless handheld device 4 allows a user to log on and log off of one or more of remote devices 8 without requiring the user to remember or enter a user name and/or password which may be different for each of remote devices 8. In particular, upon completing an initial registration process to register a user as being authorized to operate device 4, an authorized user may operate device 4 to access remote devices 8. When a user is not authorized, wireless handheld device 4 does not operate and the user cannot access remote devices 8. More specifically, wireless handheld device 4 operates only subject to locally authenticating the user via a biometric captured from the user and may automatically attempt to authorize the user each time the user operates device 4. Consequently, wireless handheld device 4 allows an authorized user seamless access to remote devices 8.

Further, wireless handheld device 4 wirelessly transmits a command stream to access remote device 8 in response matching a biometric captured from the user to a template stored in memory 7 and does not require a secure server to store cryptographic keys. As a result, wireless handheld device 4 provides secure access to remote devices 8 and prevents unauthorized operation and access to memory 7 without requiring additional hardware, i.e., a secure server. Accordingly, wireless handheld device 4 may be particularly advantageous in scenarios that do not require the highest levels of security. Specifically, wireless handheld device 4 may be particularly advantageous in scenarios in which authorized users do not want unauthorized users to gain access to remote devices 8 but are not necessarily concerned with unauthorized users intercepting the command stream that is wireless transmitted from wireless handheld device 4 to access remote devices 8. For example, wireless communication system 2 may be particularly advantageous when employing short range wireless protocols such as RFID, UWB, wireless USB, Bluetooth, 802.11(a), 802.11(b), 802.11(e), and 802.11(g) because of the difficulty to intercept short range signals undetected. Thus, an authorized user may operate wireless handheld device 4 to access various remote devices 8 such as a personal computer at the user's residence, a laptop computer, and a workstation at the user's place of employment.

In another example, a plurality of users may be authorized to operate wireless handheld device 4 as a wireless biometric mouse to navigate a graphical user interface on a personal computer at a residence. Accordingly, a number of users within a household may operate wireless handheld device 4 to access a personal computer having a separate account, such as a Microsoft Windows XP account, for each user with various security privileges, i.e., each user has different security privileges. In this case, when a particular user operates wireless handheld device 4, device 4 logs the user into the appropriate account or may simply log the user into a single account and restrict access based on the identity of the user. As an example, a parent may operate wireless handheld device 4 to log into a personal computer with full access/administrator privileges. However, when a child of the parent operates wireless handheld device 4, device 4 may log the child into a separate XP account with restricted access or log the child into a common account but with restricted access to programs and/or websites. Specifically, biometric sensor 6 may be strategically incorporated with an operable button on device 4, such as the scroll wheel or left button of a mouse, so as to verify the identity of the user without requiring the user to perform an additional step, i.e., press additional buttons on device 4 or enter information to remote device 8. In this case, wireless handheld device 4 may automatically permit or deny the user access to the personal computer or selected programs and/or websites when the user operates device 4. Alternatively, when a user operates wireless handheld device 4 to access a personal computer or open a program on the personal computer, the user may be prompted to place a finger on biometric sensor 6 in order to verify the identity of the user and permit or deny access appropriately.

In another embodiment, wireless handheld device 4 may conform to a wireless mouse that includes resident flash memory 7 but does not include biometric sensor 6 for locally authenticating a user. In this embodiment, wireless handheld device 4 provides a single enclosure that houses a wireless mouse with flash memory and a battery (not shown) that powers the wireless mouse with flash memory. Accordingly, wireless handheld device 4 may include a switch (not shown) coupled to the battery that allows the user to control the delivery of power to operational circuitry and, thus, conserve battery power. Unlike a mouse with flash memory that communicates with and receives power from a universal serial bus (USB) or other wired connection to a personal computer or other similar computing device, a user can operate wireless handheld device 4 to control or operate remote devices 8 in a similar fashion but without the restrictions and inconvenience of a wired connection. Furthermore, unlike a common wireless mouse, i.e., a wireless mouse used to control or operate a computer, wireless handheld device 4 includes memory 7 to provide compact and transportable data storage in combination with standard wireless mouse control features. Specifically, a user can operate wireless handheld device 4 to control any compliant computer, i.e., a computer having compliant wireless communication capabilities, and can also store information such as data files, music files, and other information which can be exchanged with remote devices 8. Thus, a user may store information received from remote devices 8 in wireless handheld device 4 and send stored information to remote devices 8. Consequently, a user may only need to carry wireless handheld device 4 rather than a wireless mouse and a separate external storage device, such as an external flash memory or USB drive.

Figure 2:
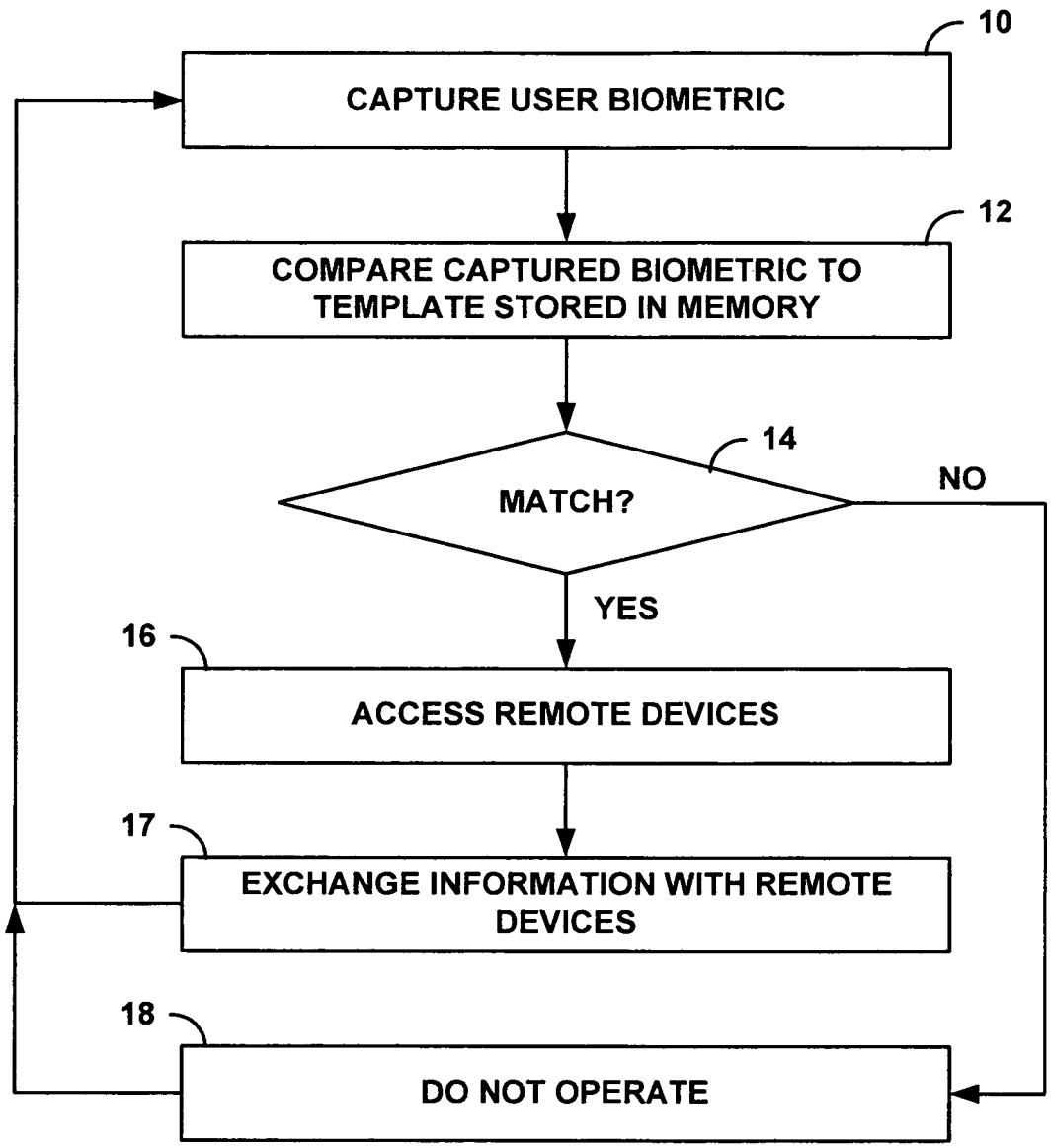
FIG. 2 is a flowchart illustrating exemplary operation of the wireless handheld device of the system in FIG. 1.

FIG. 2 is a block diagram illustrating exemplary operation of wireless handheld device 4 (FIG. 1) for securely accessing and exchanging information with remote devices 8 (FIG. 1). In particular, wireless handheld device 4 permits or denies a user access to remote devices 8 subject to local biometric authentication of the user. Initially, a user may complete a registration process to register a user as authorized to operate wireless handheld device 4. The registration process associates a user biometric with security privileges which are commonly assigned to a user's standard user name and password. Thus, in order to register a user as an authorized user, the registration process may require the user to enter a user name and password to verify the user's identity via standard verification means followed by capturing a user biometric. A digital representation of the captured biometric is stored in memory 7 (FIG. 1) and serves as a template to which future biometrics are compared. Preferably, memory 7 comprises secure memory in order to hinder an unauthorized third party from compromising wireless communication system 2 in the event that wireless handheld device 4 is stolen. The user may be required to complete the registration process for each of remote devices 8.

After completing the registration process, wireless handheld device 4 permits or denies access to remote devices 8 subject to local biometric authentication. In particular, biometric sensor 6 (FIG. 1) of wireless handheld device 4 captures a user biometric (10), e.g., a fingerprint. More specifically, biometric sensor 6 may take an image of the user's finger and generate a digital representation of the captured fingerprint and compare the digital representation of the captured biometric to the template 12 stored in memory 7 (12). If the digital representation of the captured biometric does not match the template stored in memory (14), the user is not authorized and wireless handheld device 4 does not operate (18). Thus, an unauthorized user cannot operate wireless handheld device 4 to access remote devices 8.

However, if the digital representation of the captured biometric and the template stored in memory 7 do match (14), the user is authorized to operate wireless handheld device 4. In operation, wireless handheld device 4 wirelessly transmits a command stream to access remote devices 8 of FIG. 1 (16). As an example, wireless handheld device 4 may transmit a command stream, such as "Control/Alt/Delete" followed by a user name and password and "Enter," to remotely log the authorized user onto a personal computer. The user name and password is stored in memory 7 during the initial registration process so that the user does not have to enter or recall the user name and/or password.

The authorized user may then operate wireless handheld device 4 to exchange information with remote devices 8 (17). Exchanging information with remote devices 8 may comprise providing cursor control and context menu commands to navigate a graphical user interface on a computer as well as file, folder, mail, calendar, medical, and music data that can be stored in memory 7. Thus, an authorized user may operate wireless handheld device 4 as a wireless mouse to navigate a graphical user interface on remote devices 8 and as a compact portage storage device. In any case, wireless handheld device 4 and remote devices 8 may employ encryption techniques used in existing wireless protocols to prevent unauthorized persons from intercepting user names, passwords, and other sensitive information that may comprise wireless communication system 2.

In some embodiments, exchanging information may comprise updating information stored in memory 7. When the information being updated is sensitive in nature, such as medical records, the information may be updated subject to authenticating a second party to one of remote devices 8. For example, prior to updating medical records, a medical professional may be authenticated to one of remote devices 8. The medical professional may be authenticated to one of remote devices 8 via biometrics or other authentication means such as entering a password Furthermore, wireless handheld device 4 may automatically authenticate a user each time the user operates device 4. Thus, steps 10-18 of FIG. 2 may be repeated as necessary. For example, when implemented as a wireless mouse with local biometric authentication, biometric sensor 6 may be incorporated with the scroll wheel or other operable button. In this example, wireless handheld device 4 authenticates the user each time the user operates the scroll wheel and operates only after authorizing the user. In particular, if a user attempts to operate wireless handheld device 4 to access one of remote devices 8 that is in a "locked" state, the user may be required to place a finger on the scroll wheel in order to "wake up" remote device 8 in a similar fashion to moving the trackball of a standard mouse. Biometric sensor 6 may also be strategically positioned so that the user's finger rests on biometric sensor 6 during operation so that the user can be repeatedly or continuously authenticated. Accordingly, if the user has not operated wireless handheld device 4 for a set period of time or device 4 has not authorized the user for a set period of time, device 4 may enter a "locked" or "asleep" mode. Wireless handheld device 4 may return from the "locked" mode when an authorized user places a finger on biometric sensor 6. In this manner, wireless handheld device 4 prevents unauthorized users from accessing remote devices 8 and memory 7.

Figure 3:
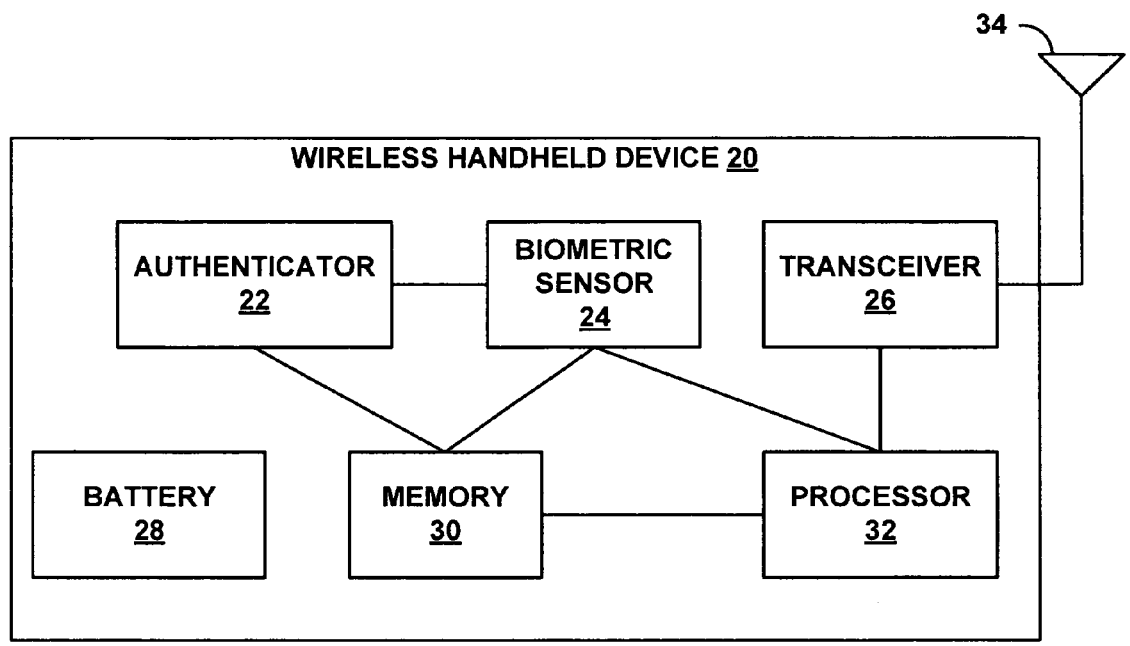
FIG. 3 is a block diagram illustrating an exemplary wireless handheld device in accordance with an embodiment of the invention.

FIG. 3 is a block diagram illustrating an exemplary wireless handheld device 20 in accordance with an embodiment of the invention. In general, wireless handheld device 20 may securely access and, optionally, exchange information with remote devices 8 (FIG. 1) in wireless communication system 2 (FIG. 1). More specifically, a user may operate wireless handheld device 20 to access remote devices 8 after being locally authenticated to device 20 via biometrics. Wireless handheld device 20 does not operate when a user has not been authenticated.

Wireless handheld device 20 may generally comprise a portable personal identification device that provides access to various remote devices such as a personal computer, a workstation, a laptop computer, and other digital computing devices to which secure remote access is desirable. The remote devices may be located in different areas. As an example, an authorized user may operate wireless handheld device 20 to log on and exchange information with a personal computer located in the user's residence, a laptop that the user may operate at any location, and a workstation at the user's place of employment. Accordingly, wireless handheld device 20 may conform to a device similar to a key fob used for keyless entry to a vehicle or other personal identification device that may easily be carried by, or attached to a user. Additionally, in some embodiments, other devices such as a wireless mouse or pointing device, a PDA, a cell phone, and other personal digital devices may be incorporated with wireless handheld device 20 in accordance with the trend of multifunctional devices. Wireless handheld device 20 may be particularly advantageous when implemented as a wireless biometric mouse with local biometric authentication since an authorized user may operate device 20 to log onto various remote devices, navigate a graphical user interface on the remote devices, and exchange information with the remote devices. Thus, wireless handheld device 20 enables secure access to various remote devices, provides compact transportable data storage, and can be operated without the restrictions and inconvenience of a mouse or pointing device with a wired connection.

When implemented as a wireless biometric mouse with local biometric authentication, biometric sensor 24 may be incorporated with the scroll wheel or other operable buttons of a mouse. Alternatively, biometric sensor 24 may be strategically positioned so that a user's finger rests on biometric sensor 24 during operation. In any case, biometric sensor 24 generally captures a biometric, e.g., a fingerprint, from the user and generates a digital representation of the captured biometric. For example, biometric sensor 24 may comprise a fingerprint microchip transducer which takes an image of the user's finger and generates a digital representation of the image. However, the fingerprint microchip transducer is merely exemplary and should not be considered limiting. In other embodiments, biometric sensor 24 may comprise other transducers for capturing other types of biometrics, such as voice characteristics, iris pattern, and facial features.

Authenticator 22 compares the digital representation of the captured biometric to a template stored in flash memory 30. The template to which the digital representation of the captured biometric is compared is stored in memory 30 upon completing the previously described registration process that registers a new user as being authorized to operate wireless handheld device 20. Specifically, the template is stored in memory 30 and, thus, critical biometric information is not transferred to a remote device or any external component over a communication channel. In any case, when authenticator 22 determines that the digital representation of the captured biometric matches the template stored in memory 30, the user is authorized and can operate wireless handheld device 20. However, if authenticator 22 determines that the digital representation of the captured biometric does not match the template stored in flash memory 30, the user is not authorized and wireless handheld device 20 does not operate. Specifically, an unauthorized user cannot operate wireless handheld device 20 or access memory 30.

Memory 30 may be implemented as secure flash memory in order to prevent the template or other stored information from being recovered or associated with a user if wireless handheld device 20 is stolen. In general, memory 30 may be implemented as any storage element suitable for compact data storage, such as flash memory, a micro hard drive, electrically-erasable-programmable-read-only-memory (EEPROM), non-volatile random-access-memory (NVRAM), and other non-volatile or volatile memory types, such as synchronous random-access-memory (SDRAM) with battery back up. In any case, biometric sensor 24 and authenticator 22 are coupled to memory 30 in order to store the template resulting from the registration process and to retrieve the template for comparison to a digital representation of a captured biometric, respectively.

Wireless handheld device 20 includes transceiver 26 coupled to antenna 34 for wirelessly communicating with remote devices 8 which are programmed to receive input from and transmit output to device 20. In particular, transceiver 26 and remote devices 8 may employ wireless protocols such as RFID, Ultra Wideband (UWB), wireless USB, Bluetooth, 802.11(a), 802.11(b), 802.11(e), 802.11(g), or other wireless protocols to wirelessly communicate with each other.

In particular, transceiver 26 transmits a command stream, in accordance with a wireless protocol, to remotely access remote devices 8 after a user has been biometrically authenticated. For example, transceiver 26 may transmit a command stream, such as "Control/Alt/Delete" followed by a user name and password and "Enter," to remotely log the authorized user onto a personal computer. Transceiver 26 does not transmit a command stream or any information to remote devices 8 until the user has been authenticated. When the personal computer has been accessed, an authorized user may operate wireless handheld device 20 to navigate a graphical user interface on the remote device. In particular, transceiver 26 may wirelessly communicate input, such as cursor control and context menu commands, to a personal computer. Additionally, transceiver 26 may wirelessly communicate with a personal computer to transmit information, such as file, folder, mail, music, calendar, medical, and other information stored in memory 30 to the personal computer. Accordingly, transceiver 26 may also receive information from the personal computer and store the received information in memory 30. In this manner, wireless handheld device 20 provides compact portable data storage in addition to providing remote access and control of remote devices 8. Consequently, an authorized user may carry wireless handheld device 20 to access and control operation of various remote devices 8 located in different areas without being required to remember or enter user names or passwords or carry a separate compact data storage device.

Processor 32 generally handles the transmission and reception of information in accordance with a wireless communication protocol. In particular, processor 32 may be responsible for identifying and formatting information directed to and from wireless handheld device 20. For example, in response to receiving a signal that a user has been authenticated from authenticator 22, processor 32 may retrieve a user name and password from memory 30 and format the command stream for transmission to remote devices 8. If more than one user name and password is stored in memory 30, processor 32 selects the appropriate user name and password to access the desired one of remote devices 8. In addition, processor 32 may control coordinate or movement signals when wireless handheld device 20 is implemented as a wireless biometric mouse with local biometric authentication. Processor 32 may also encrypt the command stream or any communication between wireless handheld device 20 and remote devices 8 to prevent an unauthorized third party from intercepting the command stream. Processor 32 may employ encryption techniques used in wireless communication protocols.

Battery 28 is electrically coupled and provides battery power to authenticator 22, biometric sensor 24, transceiver 26, memory 30, and processor 32. Battery 28 may comprise a conventional battery used in existing wireless handheld devices such as an alkaline, Lithium, NiMH, or other battery. In some embodiments, wireless handheld device 20 may also include a user operable switch (not shown) coupled to battery 28 that allows a user to control when power is delivered to device 20. Thus, battery power may be conserved by activating the switch to provide power to wireless handheld device 20 when the user intends to operate device 20 and de-activating the switch when the user does not intend to operate device 20. In alternative embodiments, battery 28 may comprise a rechargeable battery. In this case, wireless handheld device 20 may include a port or connector that receives a power cable which provides outlet power to recharge battery 28 when connected to device 20. In yet another embodiment, wireless handheld device 20 may mate with a power cradle that recharges battery 28 when wireless handheld device 20 is connected to the power cradle.

Figure 4:
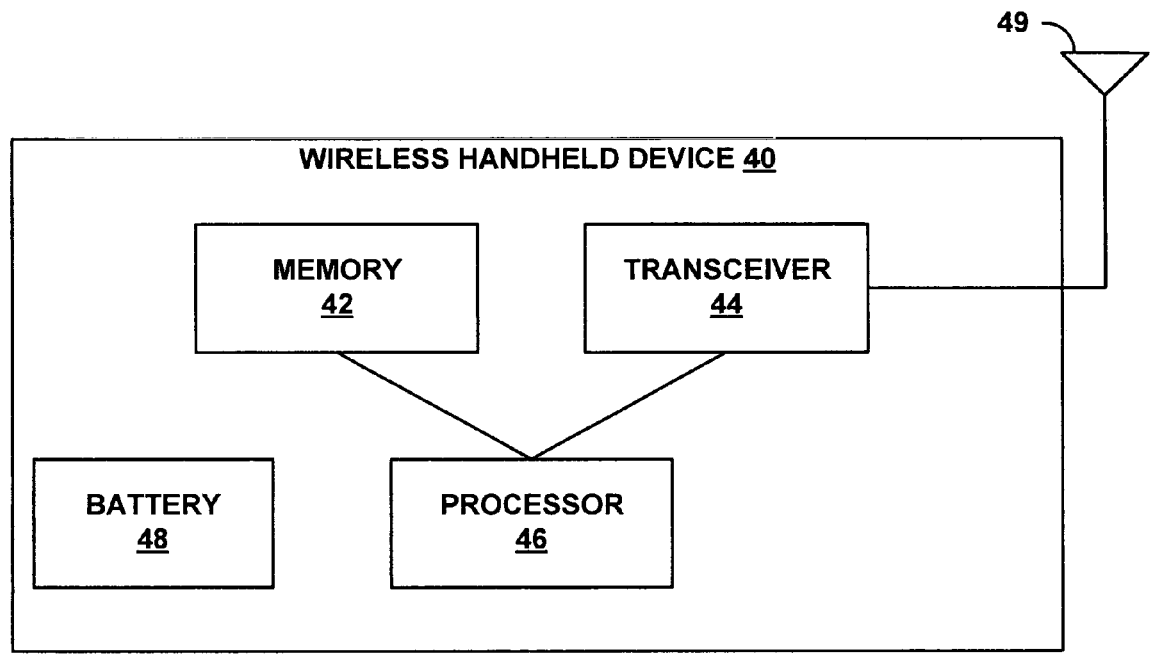
FIG. 4 is a block diagram illustrating an exemplary wireless handheld device in accordance with another embodiment of the invention.

FIG. 4 is a block diagram illustrating an exemplary wireless handheld device 40 in accordance with another embodiment of the invention. In general, wireless handheld device 40 wirelessly communicates with remote devices 8 (FIG. 1) of wireless communication system 2 (FIG. 1) and includes resident memory 42 to store information. Wireless handheld device 40 does not require local biometric authentication or any authentication means to operate. In particular, wireless handheld device 40 may be implemented as a wireless handheld mouse with resident memory 42 for storing information such as files, folders, music, calendar, and other information. By incorporating resident memory 42 within a conventional enclosure for a wireless mouse, wireless handheld device 40 can be powered by a single battery 48. Thus, wireless handheld device 40 comprises a wireless mouse having resident compact data storage that enables a user to navigate a graphical user interface on remote devices 8.

As an example, a user may operate wireless handheld device 40 to navigate graphical user interface remote devices 8. In particular, the user may operate wireless handheld device 40 to control the graphical user interface on remote devices 8 to create or modify a text, data, media, or other file type. The user can then save the file to memory 42. More specifically, wireless handheld device 40 and remote devices 8 wirelessly communicates with remote devices 8, in accordance with an existing wireless communication protocol, to receive the file or other information and stores the received information in memory 42. The user can then carry wireless handheld device 40 to a different one of remote devices 8, which is located in a different location, and operate device 40 to modify the file stored in memory 42. In other words, wireless handheld device 40 comprises a wireless mouse with resident wireless compact data storage. Thus, unlike a mouse with flash memory that communicates with and receives power from a computer via a USB or other wired connection, wireless handheld device 40 wirelessly communicates with remote devices 8 to send information stored in resident memory 42, receive information to be stored in resident memory 42, and navigate a graphical user interface on remote devices 8. As a result, wireless handheld device 40 provides advantages over a conventional wired mouse with flash memory. Moreover, relative to a conventional wireless mouse wireless handheld device 40 provides the advantage of data storage and data/file transfer capabilities.

Wireless handheld device 40 may be implemented within a single enclosure that substantially conforms to the shape and size of a conventional wireless mouse. The enclosure houses memory 42, transceiver 44, processor 46, battery 48, and antenna 49. Battery 48 may comprise a conventional battery used in existing wireless mouse devices, such as an alkaline, Lithium, or NiMH battery, and provides power to memory 42, transceiver 44, and processor 46. In some embodiments, wireless handheld device 40 may include a user operable switch (not shown) coupled to battery 48 that allows a user to control when power is delivered to device 40. Thus, the user may conserve battery power by activating the switch to provide power to wireless handheld device 40 during operation and de-activating the switch when device 40 is not in operation. In alternative embodiments, battery 48 may comprise a rechargeable battery. In these cases, wireless handheld device 40 may include a port or connector that receives a power cable which provides outlet power to recharge battery 48 when connected to device 40. In another embodiment, wireless handheld device 40 may mate with a power cradle that recharges battery 48 when connected to the power cradle. In yet another embodiment, wireless handheld device 40 may include a USB port so that, when connected to remote devices 8 via a USB cable, battery 48 can be recharged from power received via the USB cable.

Wireless handheld device 40 also includes transceiver 44 and antenna 49 for wirelessly communicating with remote devices 8 which are programmed to receive input from and transmit output to device 40. In particular, transceiver 44 and remote devices 8 may employ wireless protocols such as RFID, Ultra Wideband (UWB), wireless USB, Bluetooth, 802.11(a), 802.11(b), 802.11(e), 802.11(g), or other wireless protocols to wirelessly communicate with each other.

In particular, transceiver 44 transmits input and receives input, in accordance with a wireless protocol, to navigate a graphical user interface on remote devices 8. For example, transceiver 44 may transmit and receive input and output such as cursor control, context menu commands, and other commands commonly associated with a wireless mouse or pointing device. Transceiver 44 wirelessly communicates with remote devices 8 to send and receive information stored in memory 42.

Resident memory 42 of wireless handheld device 40 stores information received from remote devices 8 and may be implemented as flash memory. However, memory 42 may be also be implemented as any storage element suitable for compact data storage, such as a micro hard drive, EEPROM, NVRAM, and other non-volatile or volatile memory types, such as SDRAM with battery back up.

Processor 46 generally processes input and directional signals that control operation of the mouse and handles the transmission and reception of information in accordance with a wireless communication protocol. In particular, processor 46 may be responsible for identifying and formatting information directed to and from wireless handheld device 40. For example, processor 46 may selectively access memory 42 to retrieve and store data based on input received from the user and may also control coordinate or movement signals. Processor 46 may also encrypt the command stream or any communication between wireless handheld device 40 and remote devices 8 to prevent an unauthorized third party from intercepting the command stream. Processor 46 may employ encryption techniques used in existing wireless communication protocols, as is well understood by those skilled in the art, and need not be described in detail.

Figure 5A:
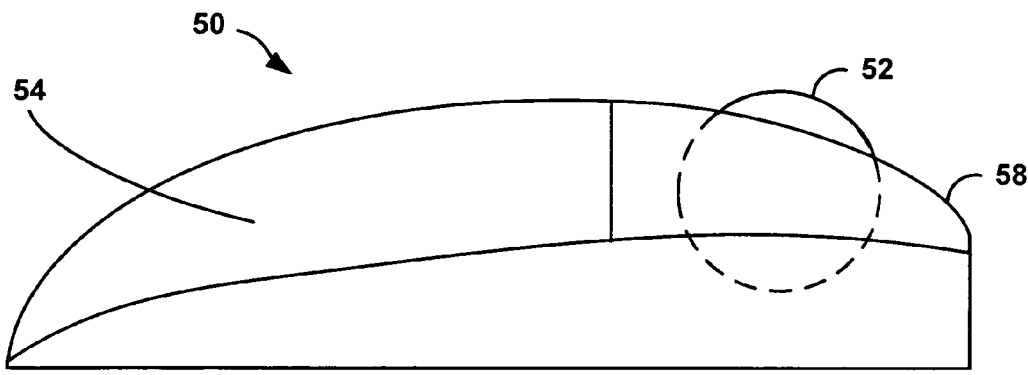
FIGS. 5A-5C are right, left, and top views, respectively, of an exemplary wireless mouse with local biometric authentication capabilities.
Figure 5B:
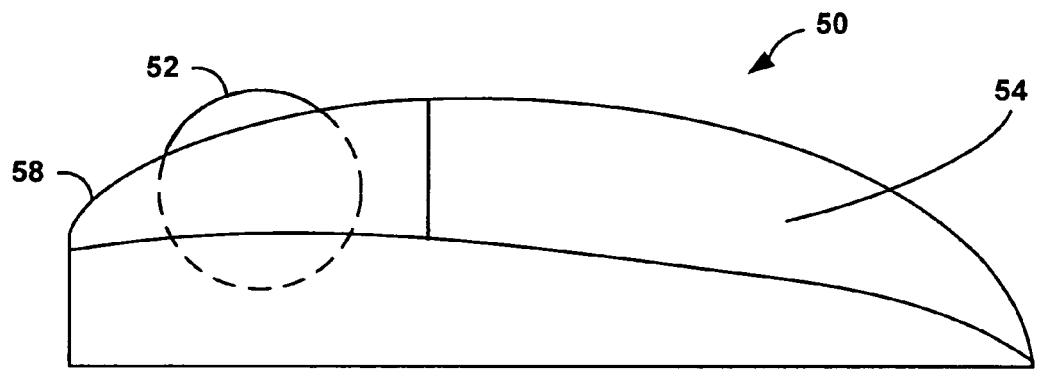
Figure 5C:
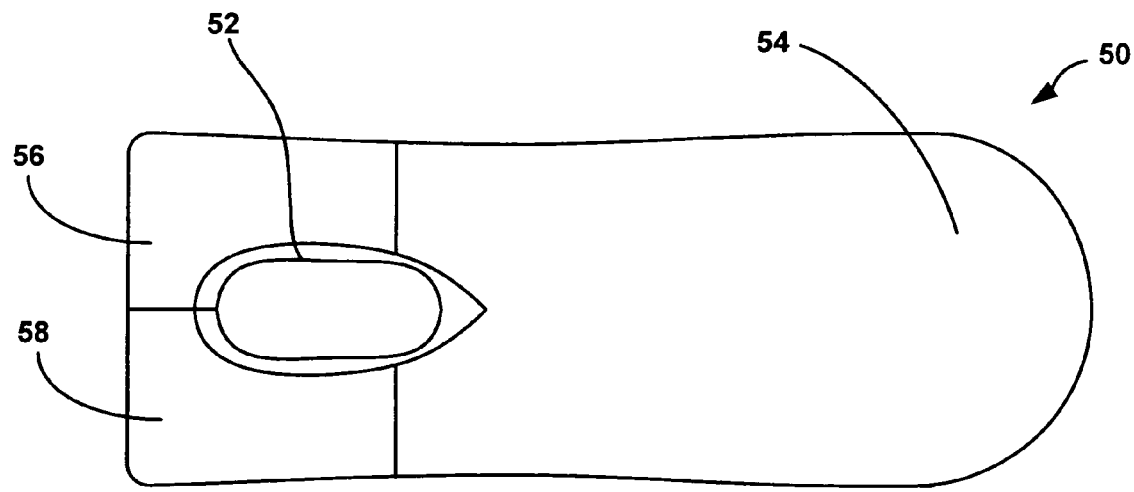

FIGS. 5A-C are right, left, and top views, respectively, of an exemplary wireless handheld device 50, e.g., a wireless mouse with local biometric authentication, according to an embodiment of the invention. In general, a user may operate wireless handheld device 50 to securely access and, optionally, exchange information with remote devices 8 (FIG. 1) subject to being locally authenticated via biometrics. Wireless handheld device 50 includes an enclosure 54 that houses various electrical components of the device including one or more storage elements such as one or more flash memory drives or other suitable compact data storage elements, circuitry for wireless communication with remote devices and control of graphical user interfaces on remote devices 8, and a battery that powers the storage elements and circuitry. Wireless handheld device 50 also includes a scroll wheel incorporated with a biometric sensor (herein referred to as "biometric scroll wheel") 52 that captures a biometric from a user and locally authenticates the user based on the captured biometric. In addition, wireless handheld device 50 includes conventional right and left buttons 56 and 58, respectively, which an authorized user can operate to provide input to remote devices 8.

Enclosure 54 is sized to conform to a conventional wireless mouse and may be ergonomically designed to be easily operated by a user. Accordingly, right and left buttons 56 and 58 as well as biometric scroll wheel 52 may be strategically positioned, as shown, so that a user's fingers rest on buttons 56 and 58 and biometric scroll wheel 52 during normal operation. In some embodiments, wireless handheld device 50 may be implemented with an optical sensor (not shown) to track movement of the device. In other embodiments, wireless handheld device 50 may be implemented with a trackball or other mechanical parts (not shown) to track the movement of the device. In this case, the trackball may be located on the bottom surface of wireless handheld device 50 to track movement of device 50 along a surface. Alternatively, the trackball may be located on an upper or side surface of device 50 so that a user may rotate the trackball while device 50 remains stationary.

Enclosure 54 may house an alkaline, Lithium, Lithium-ion, NiMH, or other battery used in existing wireless handheld devices to provide power to the storage elements and circuitry. Accordingly, wireless handheld device 50 may include a switch (not shown) coupled to the battery that allows a user to control the delivery of power to the device. Thus, battery power may be conserved by activating the switch to provide power during operation of wireless handheld device 50 and de-activating the switch when the device is not in use. If wireless handheld device 50 is powered by a conventional alkaline battery, enclosure 54 may include a cavity (not shown) that houses an alkaline battery. The cavity may be accessible via a removable cover (not shown) that permits a user to access and replace the battery. However, if the battery comprises a rechargeable battery, e.g., a Lithium-ion or NiMH battery, enclosure 54 may include a port or connector (not shown) for receiving a power cable that provides outlet power to recharge the battery when connected to the device. Alternatively, enclosure 54 may include a connector and be sized to mate with a power cradle that provides outlet power to recharge the battery when the device is connected to the power cradle.

Biometric scroll wheel 52 may comprise a biometric sensor incorporated with a conventional scroll wheel commonly implemented in a conventional wireless mouse. For example, biometric scroll wheel 52 may comprise a fingerprint microchip transducer or other transducer for capturing other types of biometrics incorporated with a conventional scroll wheel. In any case, biometric scroll wheel 52 captures a biometric from the user, generates a digital representation of the captured fingerprint, and compares the digital representation of the captured biometric to a template stored in resident memory, as previously described. If the digital representation of the captured biometric does not match the template, wireless handheld device 50 does not operate and, thus, does not wirelessly communicate or access remote devices 8. However, if the digital representation of the captured biometric matches the template, the user is authorized and can operate wireless handheld device 50 to securely access remote devices 8. By incorporating the biometric sensor with a conventional scroll wheel in a wireless mouse eliminates the need for a separate device that captures a biometric from a user. Moreover, an authorized user can operate wireless handheld device 50 without the restrictions and inconvenience of a wired connection.

Biometric scroll wheel 52, as shown, is positioned along the centerline of wireless handheld device 50 and generally extends above enclosure 54 to allow a user to rotate the wheel. In particular, biometric scroll wheel 52 is generally positioned to allow a user to rotate the wheel with one finger while leaving other fingers free to operate right and left buttons 56 and 58. Biometric sensor 6 may also be incorporated with other operable buttons, such as the standard right or left buttons of a mouse, or strategically positioned so that a user's finger rests on biometric sensor 6 during operation.

In operation, biometric scroll wheel 52 may capture a biometric from a user whenever the user attempts to access remote devices 8 or, alternatively, programs, software, data, or websites on remote devices 8 that may be accessed only be authorized users. Accordingly, a user may be prompted to position a finger on biometric scroll wheel 52 when attempting to access remote devices 8 or programs, software, data, or websites on remote devices 8. For example, remote devices 8 may display a text box containing instructions or may emit a sound or audible instructions to prompt the user to position a finger on biometric scroll wheel 52. In another example, biometric scroll wheel 52 may automatically attempt to authorize a user during operation. In other words, when a user attempts to access remote devices 8, biometric scroll wheel 52 may automatically perform the authorization process and permit or deny the user access based on the biometric captured from the user. Biometric scroll wheel 52 may also repeatedly authorize the user each time the user operates the wheel or may continuously authorize the user if the user's finger continually rests on the wheel during operation. Thus, wireless handheld device 50 may require one time authentication to access remote devices or may repeatedly authorize the user after initial access. Consequently, wireless handheld device 50 prevents an unauthorized user from operating the device even when an authorized user has left remote devices 8 for a brief period of time.

Various embodiments of the invention have been described. These and other embodiments are within the scope of the following claims.

The invention claimed is:

1. A wireless mouse that includes a scroll wheel, the wireless mouse comprising:
   a biometric sensor on the scroll wheel, wherein the biometric sensor captures a biometric from a user and generates a digital representation of the captured biometric;
   memory that stores one or more biometric templates;
   an authenticator that compares the digital representation of the captured biometric to the one or more biometric templates;
   a transceiver that sends a wireless signal to access one or more remote devices subject to matching the captured biometric to one of the one or more biometric templates, wherein the wireless signal comprises a command stream that logs the user onto one or more of the remote devices, wherein the command stream includes a control/alt/delete signal, user name, and a password; and
   a battery that powers the biometric sensor, memory, authenticator, and transceiver.

2. The wireless mouse of claim 1, wherein each of the biometric templates is associated with a different user, and wherein a new biometric template is captured from a new user and stored in memory in an initial registration process that registers the user as an authorized user.

3. The wireless mouse of claim 1, wherein the wireless signal further comprises one of a file, a folder, medical records, music, and a calendar stored in the memory.

4. The wireless mouse of claim 1, further comprising a processor that encrypts the wireless signal in accordance with encryption techniques.

5. The wireless mouse of claim 1, wherein the transceiver sends the wireless signal in accordance with one of a radio frequency identification (RFID), Ultra Wideband (UWB), wireless universal serial bus (USB), Bluetooth, 802.11(a), 802.11(b), 802.11(e) and 802.11(g).

6. The wireless mouse of claim 1, wherein the memory stores sensitive information and updates the sensitive information subject to authenticating a second party to one of the remote devices.

7. A method comprising:
  capturing a biometric from a user in a wireless mouse via a biometric sensor positioned on a scroll wheel of the wireless mouse;
  comparing the captured biometric to one or more biometric templates stored in a resident memory of the wireless mouse;
  when the captured biometric matches one of the biometric templates, sending a wireless signal from the wireless mouse to access one or more remote devices, wherein the wireless signal comprises a command stream that logs the user onto one or more of the remote devices, wherein the command stream includes a control/alt/delete signal, a user name, and a password;
  when the captured biometric does not match one of the biometric templates, denying access to the remote devices via the wireless mouse.

8. The method of claim 7,
  wherein capturing the biometric from the user comprises generating a digital representation of an image associated with the user, and
  wherein comparing the captured biometric comprises comparing the digital representation of the image to the biometric templates.

9. The method of claim 7, further comprising performing an initial registration process to register the user as a new user authorized to operate the wireless mouse, wherein the initial registration process captures a biometric from the user, stores the captured biometric as a biometric template in the resident memory, and authorizes the user.

10. The method of claim 7, wherein sending the wireless signal further comprises sending at least one of a file, a folder, medical records, music and a calendar.

11. The method of claim 7, wherein sending the wireless signal comprises encrypting the wireless signal.

12. The method of claim 7, further comprising updating information stored in resident memory of the wireless mouse subject to authenticating a second party user to one of the remote devices.

* * * * *

UNITED STATES PATENT AND TRADEMARK OFFICE
CERTIFICATE OF CORRECTION

PATENT NO. : 7,664,961 B2  Page 1 of 1
APPLICATION NO. : 11/224889
DATED : February 16, 2010
INVENTOR(S) : Blattner et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1192 days.

Signed and Sealed this

Seventh Day of December, 2010

David J. Kappos
*Director of the United States Patent and Trademark Office*